United States Patent [19]

Tatematsu et al.

[11] Patent Number: 4,982,573
[45] Date of Patent: Jan. 8, 1991

[54] ELECTRIC CONTROL APPARATUS FOR AUGER TYPE ICE MAKING MACHINE

[75] Inventors: Susumu Tatematsu, Nagoya; Yasumitsu Tsukiyama, Toyoake; Junichi Hida, Nagoya, all of Japan

[73] Assignee: Hoshizaki Denki Kabushiki Kaisha, Toyoake, Japan

[21] Appl. No.: 514,065

[22] Filed: Apr. 24, 1990

[30] Foreign Application Priority Data

Apr. 25, 1989 [JP] Japan .................. 64-103411

[51] Int. Cl.5 .................................... F25C 1/14
[52] U.S. Cl. ........................... 62/135; 62/188; 62/233
[58] Field of Search ............. 62/135, 233, 354, 188

[56] References Cited

U.S. PATENT DOCUMENTS

| | | | |
|---|---|---|---|
| 3,365,901 | 1/1968 | Guard | 62/233 X |
| 3,511,059 | 5/1970 | Hoenisch | 62/354 X |
| 4,622,826 | 11/1986 | Tsukiyama et al. | 62/233 X |
| 4,641,501 | 2/1987 | Simkens | 62/188 |
| 4,644,757 | 2/1987 | Hida et al. | 62/233 X |
| 4,932,216 | 6/1990 | Ito | 62/233 X |

FOREIGN PATENT DOCUMENTS 63-10453 3/1988 Japan .

*Primary Examiner*—William E. Tapolcai
*Attorney, Agent, or Firm*—Armstrong, Nikaido, Marmelstein, Kubovcik & Murray

[57] ABSTRACT

An electric control apparatus for an auger type ice making machine having an auger mounted for rotary movement within an evaporator housing to which water is supplied form a water tank to cause ice crystals to form on the internal freezing surface of the evaporator housing. The control apparatus includes a first water level detector disposed within the water tank to produce a first signal therefrom when a level of water in the tank has fallen to a lower limit level, a second watr level detector disposed within th watr tank to produce a second signal therefrom the level of water has risen up to an upper limit level, a timer cooperable with the second water level detector for measuring a predetermined period of time in response to the second signal, the period of time being determined to correspond with a time interval defined by the first and second signals in normal operation of the ice making machine and adjusted taking into consideration a time for which operation of the ice making machine is made in a stable condition, and a relay circuit cooperable with the timer for rendering the ice making machine inoperative when the predetermined period of time has been measured by the timer before applied with the first signal.

4 Claims, 6 Drawing Sheets

ELECTRIC CONTROL APPARATUS FOR AUGER TYPE ICE MAKING MACHINE

BACKGROUND OF THE INVENTION

1. Field of the Invention

The present invention relates to an electric control apparatus for auger type ice making machines, more particularly to an electric control apparatus for protecting the ice making machine from an excessive load applied thereto in operation.

2. Discussion of the Prior Art

As schematically illustrated in FIG. 6, a conventional auger type ice making machine incorporates an auger which is mounted for rotary movement within the cylindrical housing 012 of an evaporator 011 to which water is supplied to cause ice crystals to form on the internal freezing surface of the evaporator housing 012. As the auger is driven by an electric motor 013, the helical blade thereof scraps the ice crystals off the internal freezing surface of the evaporator housing 012 and advances the scraped ice crystals upwardly toward an extruding head 014. The ice compressed at the extruding head 014 is broken by a breaker blade and delivered as pieces of hard ice to an ice storage bin 015. The storage bin 015 has an opening arranged to permit the pieces of hard ice to move outwardly along an appropriate delivery chute attached thereto. If in operation the delivery chute is blocked up due to the pieces of hard ice accumulated thereon, the storage bin 015 will be fully filled with the pieces of hard ice delivered from the extruding head 014. As a result, the pieces of hard ice are frozen in the storage bin 015 to cause an excessive load acting on the auger. To eliminate such an excessive load acting on the auger, a pressure gauge 016 is provided to detect a pressure drop of refrigerant in the refrigeration circuit 010, and a hot gas valve 017 is disposed in a bypass line of the refrigeration circuit to be opened for dissolution of the frozen ice when the pressure drop of refrigerant has been detected by the pressure guage 016.

In Japanese Utility Model Publication No. 61-28999, there is disclosed such an auger type ice making machine as shown in FIG. 7, wherein an auger 022 is mounted for rotary movement within the cylindrical housing of an evaporator 023 to which water is supplied to be formed into ice crystals on the internal freezing surface 024 of the evaporator housing. In the ice making machine, ice crystals scraped by the helical blade of auger 022 is pushed upwardly toward a compression chamber 025, and the ice compressed at chamber 025 is broken by a breaker blade 026 and delivered as pieces of hard ice to move outwardly along a chute 027. In Japanese Patent Publication No. 56-40258, there is also disclosed such an auger type ice making machine as shown in FIG. 8, the construction of which is substantially the same as that of FIG. 7. In the ice making machine shown in FIG. 7 or 8, a movable plate 028 is arranged to be pushed up by the pieces of hard ice packed in the storage bin of the machine, and a normally open detection switch 029 is associated with with the movable plate 028 to deactivate the electric motor 021 for the auger when it has been closed by upward movement of the movable plate 028.

In operation of the ice making machine, the ice crystals in the evaporator housing are frozen in the occurrence of shortage or suspension of water supply to the auger 022. Such abnormal freezing phenomenon of ice crystals may not be avoided. To avoid the abnormal freezing phenomenon caused by the shortage of water supply, Japanese Patent Publication No. 57-41669 discloses an electric control apparatus for the auger type ice making machine which includes a water level detector arranged to detect the level of water in the evaporator housing thereby to deactivate the electric motor for the auger when detected an abnormal fall of the water level. To avoid the abnormal freezing phenomenon caused by suspension of water supply, Japanese Utility Model Publication No. 60-17655 discloses an electric control apparatus for the auger type ice making machine which includes a float switch disposed within a water tank in communication with the evaporator housing to detect the level of water in the water tank thereby to deactivate the electric motor for the auger and the compressor in the refrigeration circuit when detected an abnormal fall of the water level.

Under control of the hot gas valve described above, the pressure drop of refrigerant in the refrigeration circuit is detected after the ice crystals in the evaporator housing have been frozen. It is, therefore, impossible to avoid the occurrence of an excessive load acting on the auger and the abnormal freezing phenomenon caused by shortage of water supply. In the case that a constant pressure expansion valve is adapted to maintain the pressure of refrigerant in the refrigeration circuit at a predetermined level, the control of the hot gas valve may not be adapted. It is further apparent that the detection switch associated with the movable plate is useless to avoid the abnormal freezing phenomenon in the evaporator housing caused by suspension of water supply, whereas the water level detector is useless to eliminate an excessive load caused by the pieces of hard ice packed in the storage bin.

SUMMARY OF THE INVENTION

It is, therefore, a primary object of the present invention to provide an electric control apparatus for the auger type ice making machine capable of protecting the auger from an excessive load caused by the pieces of hard ice packed in the storage bin and of avoiding an abnormal freezing of ice crystals in the evaporator housing caused by shortage or suspension of water supply.

According to the present invention, the primary object is attained by providing an electric control apparatus for an auger type ice making machine having an auger mounted for rotary movement within an evaporator housing to which water is supplied from a water tank to cause ice crystals to form on the internal freezing surface of the evaporator housing, which comprises a first water level detector disposed within the water tank to detect a level of water in the water tank for producing a first signal therefrom when the level of water has fallen to a lower limit level, a second water level detector disposed within the water tank to detect the level of water in the water tank for producing a second signal therefrom when the level of water has risen up to an upper limit level, a timer cooperable with the second water level detector for measuring a predetermined period of time in response to the second signal, the period of time being determined to correspond with a time interval defined by the first and second signals in normal operation of the ice making machine and adjusted taking into consideration a time for which operation of the ice making machine is made in a stable condition to form ice crystals on the internal freezing surface of the evaporator housing; and means cooperable with the timer for rendering the ice making machine inoperative when the predetermined period of time has been measured by the timer before applied with the first signal.

BRIEF DESCRIPTION OF THE DRAWINGS

Additional objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 1:
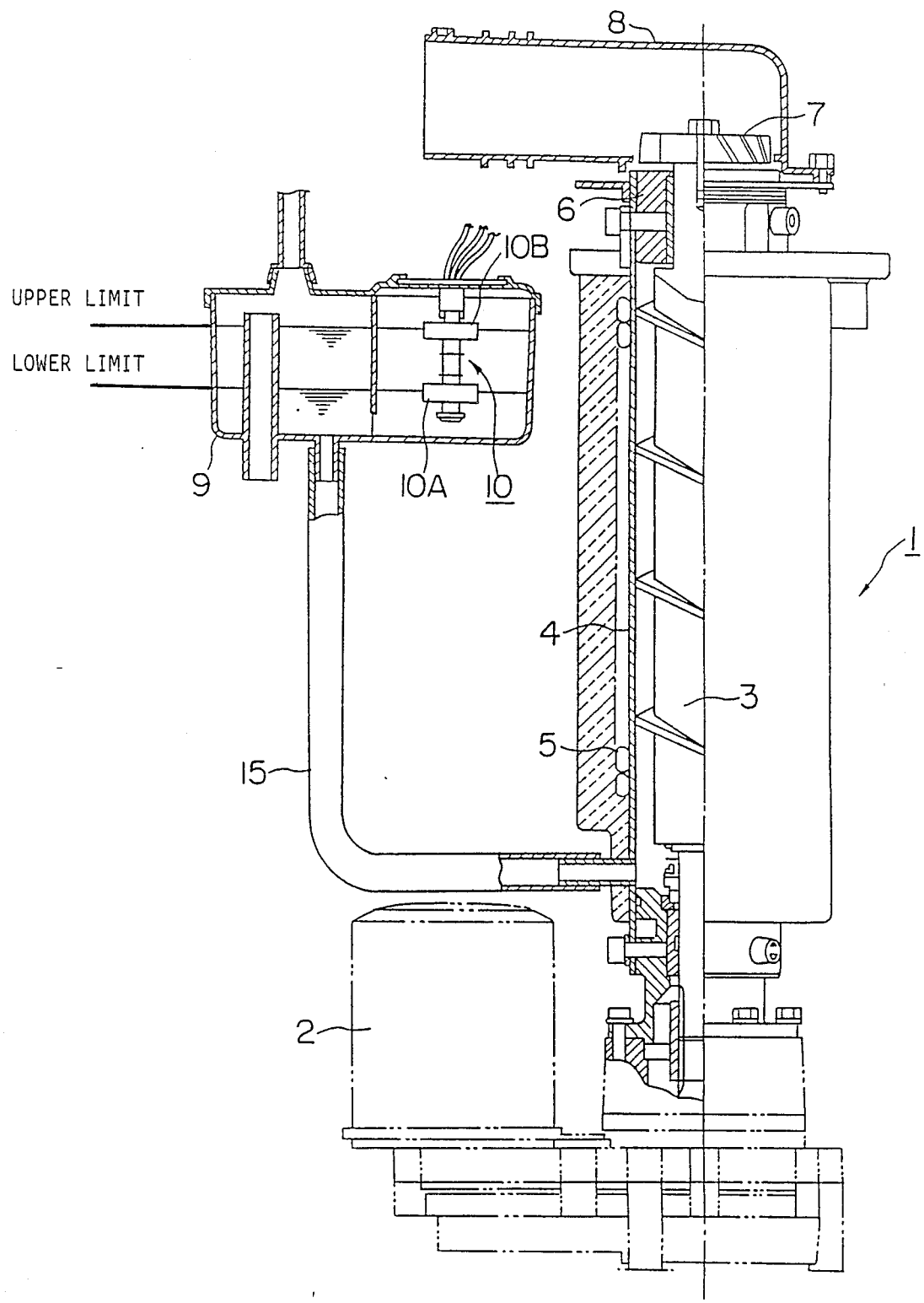
FIG. 1 is a partly broken sectional view of an auger type ice making machine.
Figure 6:
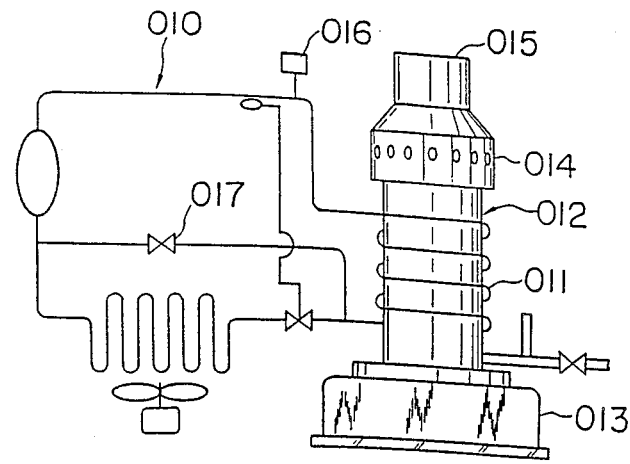
FIG. 6 is a schematic illustration of a conventional auger type ice making machine for discussion of the prior art.
Figure 7:
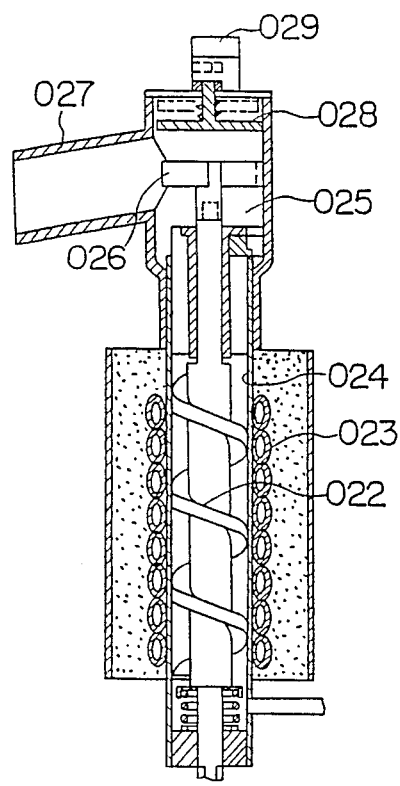
FIG. 7 is a sectional view of an auger type ice making machine disclosed in Japanese Utility Model Publication No. 61-28999.
Figure 8:
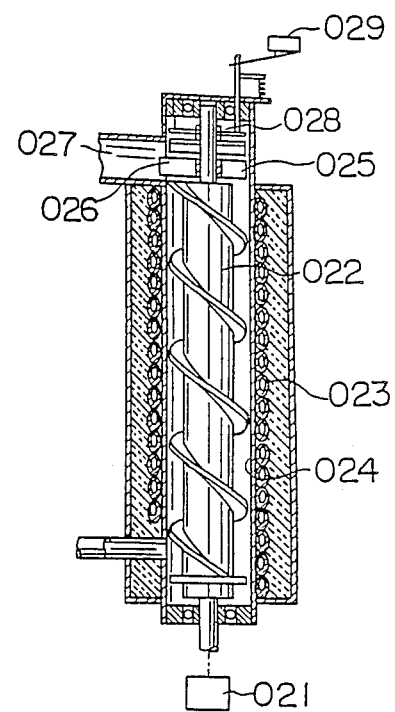
FIG. 8 is a sectional view of an auger type ice making machine disclosed in Japanese Patent Publication No. 56-40258.

Referring now to the drawings, FIG. 1 illustrates an auger type ice making machine which includes an evaporator housing 4 surrounded by a coil 5 through which refrigerant is passed in a usual manner to chill the housing 4. The evaporator coil 5 is provided as a part of such a refrigeration circuit as shown in FIG. 6 and is surrounded by an insulation material. An auger 3 is mounted for rotary movement within the evaporator housing 4 to which water is supplied to cause ice crystals to form on the internal freezing surface of the evaporator housing 4. The auger 3 has a lower shaft portion which is drivingly connected to an electric geared motor 2 to rotate the auger 3. In operation, the helical blade of auger 3 scraps the ice crystals off the internal freezing surface of evaporator housing 4 and advances the scraped ice crystals upwardly toward an extruding head 6 which forms a plenum at the top of auger 3. A breaker in the form of a cutter 7 is mounted on the auger 3 for rotation therewith, and a discharge duct 8 is mounted on the upper end of evaporator housing 4 to discharge pieces of hard ice broken by the breaker 6 therefrom into an ice storage bin (not shown).

Figure 2:
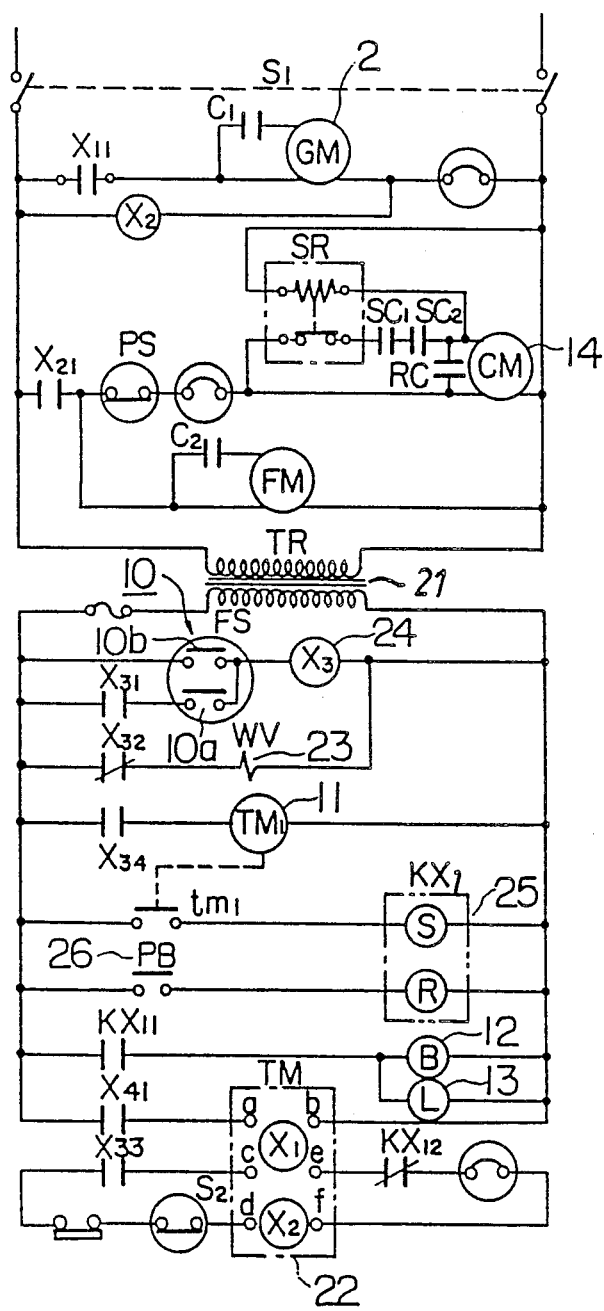
FIG. 2 is a circuit diagram of an electric control apparatus for the auger type ice making machine shown in FIG. 1.

A water tank 9 is arranged adjacent the upper portion of evaporator housing 4 to be supplied with fresh water from any suitable source of water (not shown) through a solenoid water valve 23 shown in FIG. 2. A water supply pipe 15 leading from the water tank 9 is connected to the bottom portion of evaporator housing 4 to supply fresh water to the internal freezing surface of evaporator housing 4. The water tank 9 is provided therein with a float switch assembly 10 which includes lower and upper float switches 10A and 10B of the normally open type respectively for detecting lower and upper limit levels of water in the tank 9. When the water in evaporator housing 4 is formed into ice crystals during operation of the ice making machine, fresh water from the tank 9 is continuously supplied to the internal freezing surface of evaporator housing 4 to cause fall of the water level in tank 9. When the level of water in tank 9 falls to the lower limit level, the lower float switch 10A is opened to energize the solenoid water valve 23 under control of an electric control apparatus for ice making machine shown in FIG. 2 to permit the fresh water supplied into the tank 9 from the source of water. When the level of water in tank 9 rises up to the upper limit level, the upper float switch 10B is closed to deenergize the solenoid water valve 23 under control of the electric control apparatus.

As shown in FIG. 2, the electric control apparatus includes a relay 24 ($X_3$) cooperable with normally open relay switches $X_{31}$, $X_{33}$, $X_{34}$ and a normally closed relay switch $X_{32}$ connected in series with the solenoid water valve 23. The lower float switch 10A is in the form of a normally open switch 10$a$ connected in series at its one end with the relay 24 ($X_3$) and at its other end with the normally open relay switch $X_{31}$, while the upper float switch 10B is in the form of a normally open switch 10$b$ connected in series at its one end with the relay 24 ($X_3$) and at its other end with a power source line. When the power source line is connected to an electric power source through a main switch $S_1$, the solenoid water valve 23 is energized by the electric power applied thereto through the normally closed relay switch $X_{32}$ to permit the fresh water supplied into the water tank 9 therethrough from the source of water, and in turn, the fresh water from tank 9 is supplied into the bottom portion of evaporator housing 4 through the water supply pipe 15. When the amount of fresh water in tank 9 increases up to the upper limit level, the lower float switch 10$a$ is closed and the upper float switch 10$b$ is closed to energize the relay 24 ($X_3$). In response to energization of the relay 24 ($X_3$), the normally closed relay switch $X_{32}$ is opened, while the normally open relay switches $X_{31}$, $X_{33}$ and $X_{34}$ are closed. As a result, the solenoid water valve 23 is deenergized to interrupt the supply of fresh water into the water tank 9, and the relay 24 ($X_3$) is maintained in its energized condition until the lower float switch 10$a$ is opened.

The electric control apparatus includes a timer board 22 which is provided therein with a first relay $X_1$ cooperable with a normally open relay switch $X_{11}$ and a second relay $X_2$ cooperable with a normally open relay switch $X_{21}$. The first relay $X_1$ is connected at its one end to a terminal c and at its other end to a terminal d through a first timer circuit (not shown) to be energized after lapse of a first predetermined period of time $t_1$ when the normally open relay switch $X_{33}$ has been closed by energization of the relay 24 ($X_3$). When the normally open relay switch $X_{11}$ is closed by energization of the first relay $X_1$, the electric geared motor 2 is activated by the electric power supplied through the relay switch $X_{11}$ to rotate the auger 3. The second relay $X_2$ is connected at its one end to the terminal c and at its other end to the terminal d through a second timer circuit (not shown) to be energized after lapse of a second predetermined period of time $t_2$ when the normally open relay switch $X_{33}$ has been closed. When the second relay $X_2$ is energized under control of the second timer circuit, the normally open relay switch $X_{21}$ is closed to activate a compressor 14 and an air blower motor FM of the ice making machine thereby to compress gaseous refrigerant in the refrigeration circuit. The first and second timer circuits each are in the form of such a time constant circuit as disclosed in Japanese Utility Model Publication No. 63-10453. The second predetermined period of time $t_2$ is defined to be longer than the first predetermined period of time $t_1$ for activating the compressor 14 and blower motor FM after start of the geared motor 2. In this embodiment, the second predetermined period of time $t_2$ is defined taking into consideration a time for which operation of the ice making machine is made in a stable condition to advance the ice crystals upwardly through the extruding head 6.

The electric control apparatus further includes a timer 11 ($TM_1$) which is arranged to start measurement of a third predetermined period of time $t_3$ when the relay switch $X_{34}$ has been closed in response to energization of the relay 24 ($X_3$). In this embodiment, the third predetermined period of time $t_3$ is defined on a basis of the following fact. Assuming that the ice making capacity of the machine is determined in a condition, the float switches 10a and 10b are repeatedly turned on and off at a predetermined time interval during normal operation of the ice making machine. This means that the time interval is defined in proportion to the amount of ice crystals formed in the evaporator housing 4 during normal operation of the ice making machine. In other words, the drop speed of the water level in tank 9 is determined in dependence upon the amount of ice crystals formed in the evaporator housing 4. For this reason, the third predetermined period of time $t_3$ is defined to correspond with the time interval described above. In a practical embodiment, the third predetermined period of time $t_3$ is adjusted taking into consideration of the first and second predetermined periods of time $t_1$ and $t_2$ described above.

During normal operation of the ice making machine, the water level falls to the lower limit level before lapse of the third predetermined period of time $t_3$, and in turn, the lower float switch 10a is opened to deenergize the relay 24 ($X_3$). In response to deenergization of the relay 24($X_3$), the relay switch $X_{34}$ is turned off to maintain a contact $tm_1$ of timer 11 in an open position. Assuming that in operation of the ice making machine the third predetermined period of time $t_3$ has been measured by the timer 11 in a condition where the lower float switch 10a is still maintained in its closed position, the timer contact $tm_1$ is closed, and in turn, a keep-relay 25 ($KX_1$) is energized to close a normally open relay switch $KX_{11}$ and to open a normally closed relay switch $KX_{12}$. As a result, the relays $X_1$ and $X_2$ are deenergized under control of the relay switch $KX_{12}$ to deactivate the geared motor 2 and compressor 14, and a buzzer 12 and an alarm lamp 13 are energized under control of the relay switch $KX_{11}$. Thus, the ice making machine is protected from an excessive load acting on the auger 3, and the operator is informed of an abnormal condition of the ice making machine. When the abnormal condition of the ice making machine has been eliminated, a push-buttom switch 26 (PB) is closed to reset the keep-relay 25 ($KX_1$) thereby to return the relay switches $KX_{11}$ and $K_{12}$ to their original positions.

Figure 3:
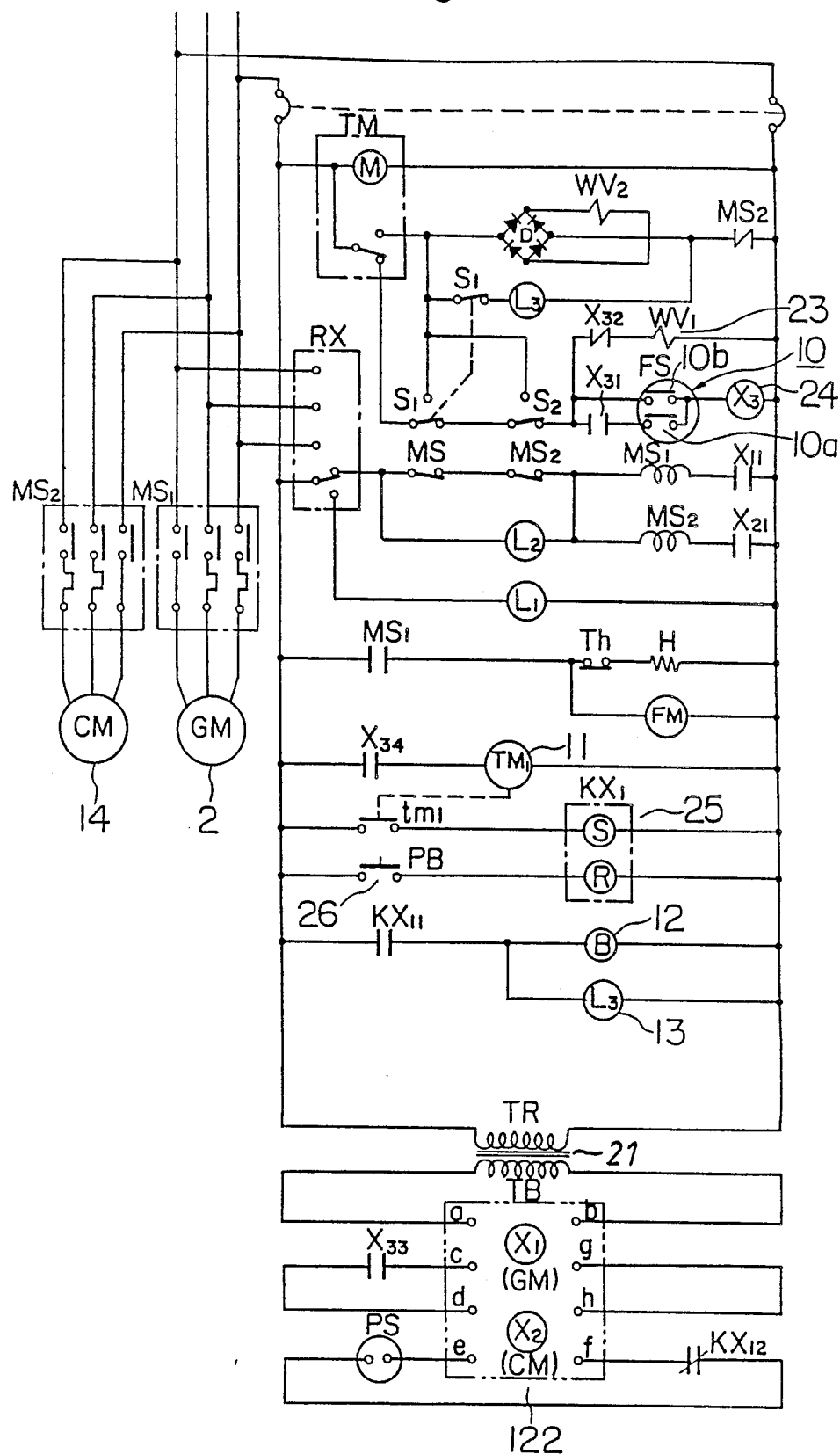
FIG. 3 is a circuit diagram of a modification of the electric control apparatus shown in FIG. 2.

In FIG. 3 there is illustrated a modification of the electric control apparatus described above, wherein the timer board 22 is replaced with a timer board 122 which is connected through a transformer 21 to the control circuit including the relay 24 ($X_3$), timer 11 ($TM_1$) and keep-relay 25 ($KX_1$). In this modification, a relay coil $MS_1$ is connected in series with the relay switch $X_{11}$ to close a normally open relay switch $MS_1$ associated therewith when it has been energized, and a relay coil $MS_2$ is connected in series with the relay switch $X_{21}$ to close a normally open relay switch $MS_2$ associated therewith when it has been energized. The other arrangement is substantially the same as that of the electric control apparatus shown in FIG. 2.

Figure 4:
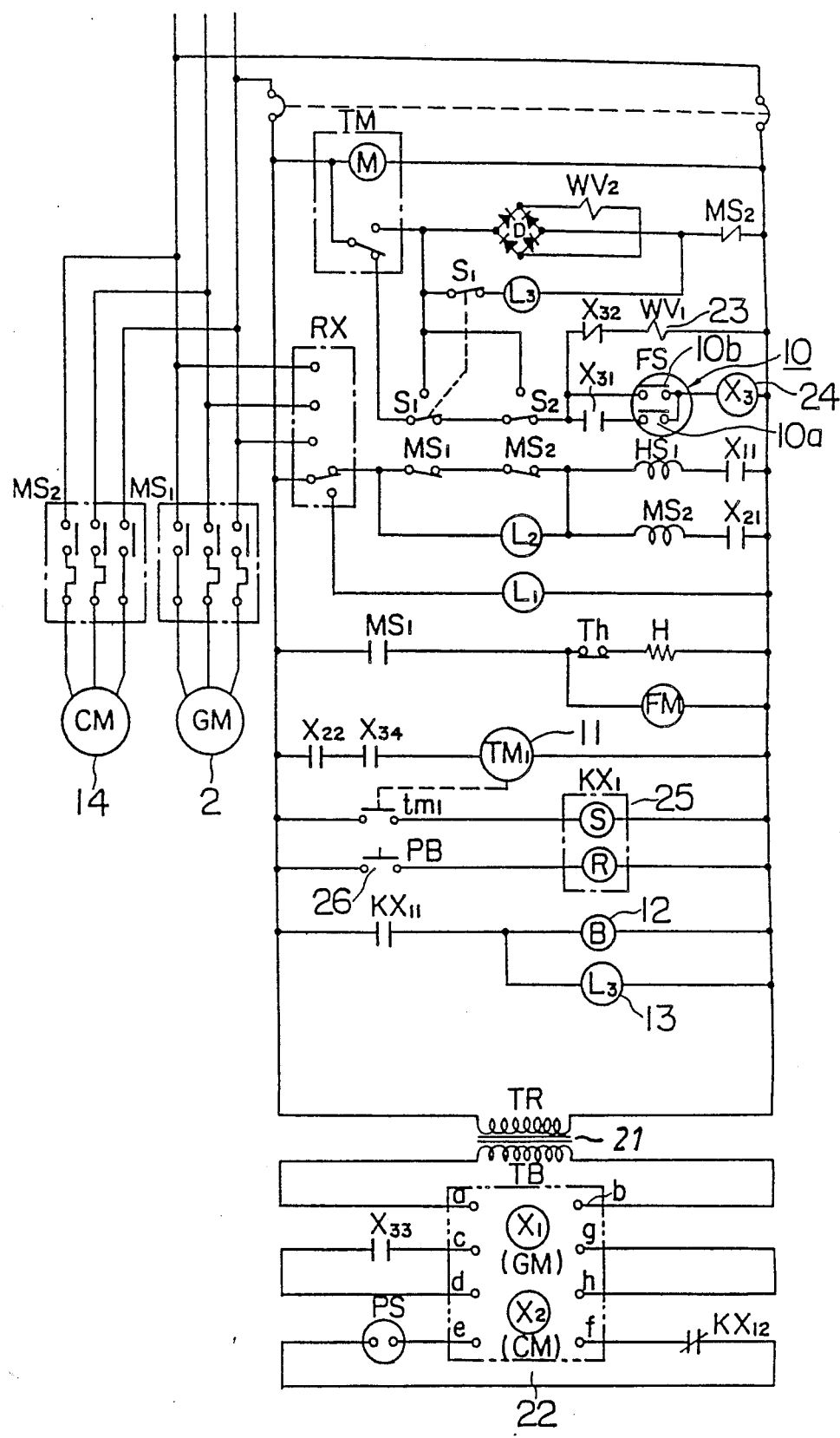
FIG. 4 is a circuit diagram of another modification of the electric control apparatus shown in FIG. 2.

In FIG. 4 there is illustrated another modification of the electric control apparatus described above, wherein a normally open relay switch $X_{22}$ is connected in series with the timer 11 ($TM_1$) through the normally open relay switch $X_{34}$. The normally open relay switch $X_{22}$ is arranged to be closed by energization of the relay $X_2$. In this modification, the timer 11 ($TM_1$) is activated in response to energization of the relay $X_2$ to start measurement of the third predetermined period of time $t_3$ after lapse of the second predetermined period of time $t_2$ when the relay $X_3$ has been energized. This means that the third predetermined period of time $t_3$ may be defined taking into consideration only the first predetermined period of time $t_1$. The other arragement is substantially the same as that of the electric control apparatus shown in FIG. 2.

Figure 5:
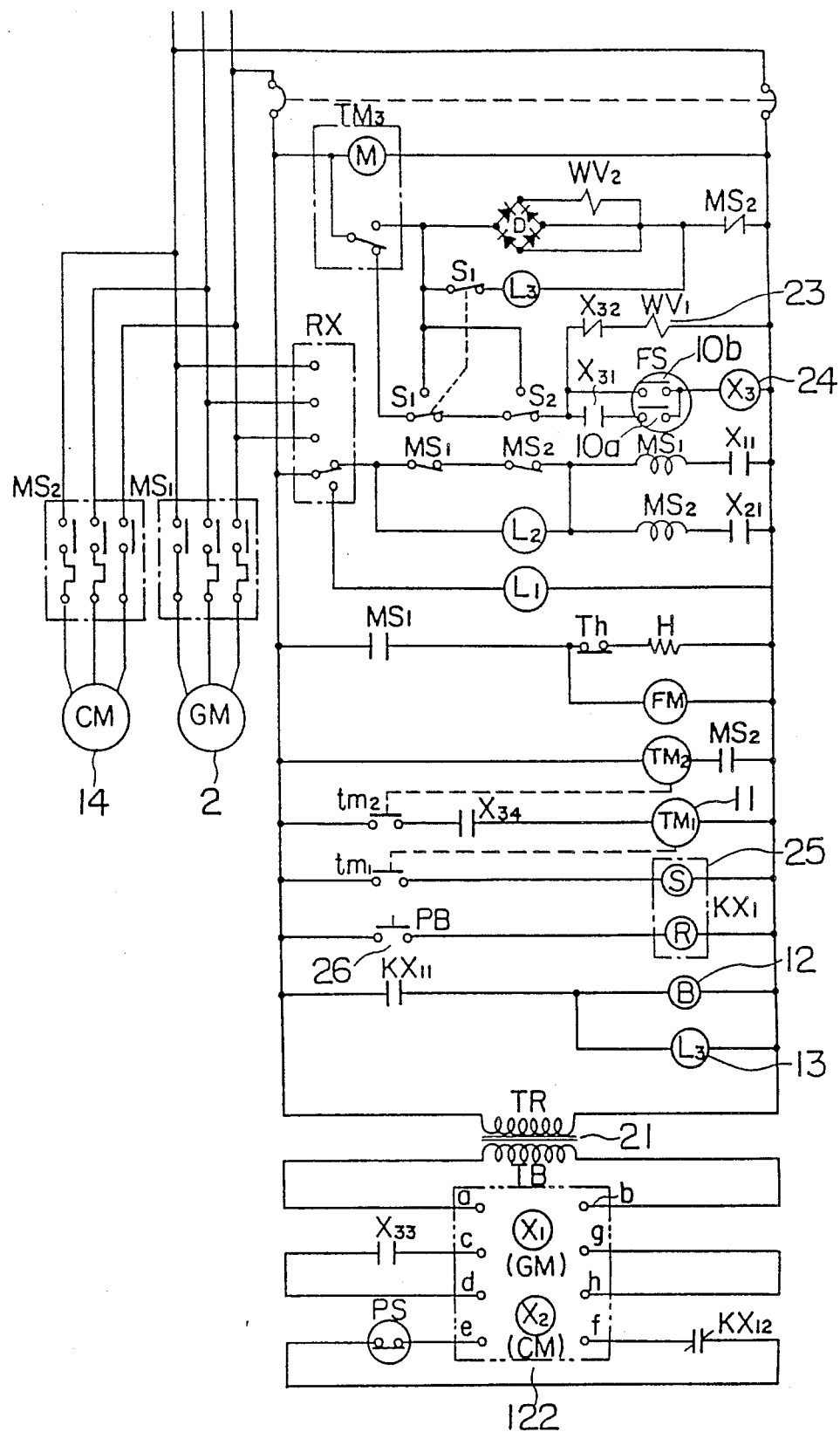
FIG. 5 is a circuit diagram of a further modification of the electric control apparatus shown in FIG. 2.

In FIG. 5 there is illustrated a further modification of the electric control apparatus described above, wherein a second timer $TM_2$ is connected in series with a normally open relay switch $MS_2$ which is arranged to be closed when the relay switch $X_{21}$ has been closed under control of the relay $X_2$. The second timer $TM_2$ is arranged to start measurement of a fourth predetermined period of time $t_4$ in response to energization of the relay $X_2$ so as to close a normally open switch $tm_2$ after lapse of the fourth predetermined period of time $t_4$. The fourth predetermined period of time $t_4$ is defined taking into consideration a time for which operation of the ice making machine is made in a stable condition after activation of the compressor 14. In this modification, the timer 11 ($TM_1$) is activated when the normally open switch $tm_2$ has been closed after lapse of the fourth predetermined period of time $t_4$.

Having now fully set forth preferred embodiments of the concept underlying the present invention, various other embodiments as well as certain variations and modifications of the embodiments shown and described herein will obviously occur to those skilled in the art upon becoming familiar with said underlying concept. It is to be understood, therefore, that within the scope of the appended claims, the invention may be practiced otherwise than as specifically set forth herein.

What is claimed is:

1. An electric control apparatus for an auger type ice making machine having an auger mounted for rotary movement within an evaporator housing to which water is supplied from a water tank to cause ice crystals to form on the internal freezing surface of said evaporator housing, the electric control apparatus comprising:
   a first water level detector disposed within said water tank to detect a level of water in said water tank for producing a first signal therefrom when the level of water has fallen to a lower limit level;
   a second water level detector disposed within said water tank to detect the level of water in said water tank for producing a second signal therefrom when the level of water has risen up to an upper limit level;

a timer cooperable with said second water level detector for measuring a predetermined period of time in response to said second signal, the period of time being determined to correspond with a time interval defined by said first and second signals in normal operation of the ice making machine and adjusted taking into consideration a time for which operation of the ice making machine is made in a stable condition to form ice crystals on the internal freezing surface of said evaporator housing; and means cooperable with said timer for rendering the ice making machine inoperative when the predetermined period of time has been measured by said timer before applied with said first signal.

2. An electric control apparatus as claimed in claim 1, wherein said means cooperable with said timer comprises a relay circuit arranged to interrupt the power supply to a refrigerant compressor and an electric motor for said auger in the ice making machine when the predetermined period of time has been measured by said timer before applied with said first signal from said first water level detector.

3. An electric control apparatus for an auger type ice making machine having an auger mounted for rotary movement within an evaporator housing to which water is supplied from a water tank to cause ice crystals to form on the internal freezing surface of said evaporator housing, the electric control apparatus comprising:

a first water level detector disposed within said water tank to detect a level of water in said water tank for producing a first signal therefrom when the level of water has fallen to a lower limit level;

a second water level detector disposed within said water tank to detect the level of water in said water tank for producing a second signal therefrom when the level of water has risen up to an upper limit level;

a first timer for measuring a first predetermined period of time in response to start of the ice making machine, the first predetermined period of time being determined taking into consideration a time for which operation of the ice making machine is made in a stable condition to form ice crystals on the internal freezing surface of said evaporator housing;

a second timer cooperable with said first timer for measuring a second predetermined period of time after lapse of the first predetermined period of time, the second predetermined period of time being determined to correspond with a time interval defined by said first and second signals in normal operation of the ice making machine; and means for cooperable with said second timer for rendering the ice making machine inoperative when the second predetermined period of time has been measured by said second timer before applied with said first signal.

4. An electric control apparatus as claimed in claim 3, further comprising means cooperable with said second timer for informing of an abnormal condition of the ice making machine when the second predetermined period of time has been measured by said second timer before applied with said first signal.

* * * * *